United States Patent
Shin et al.

(10) Patent No.: US 11,412,021 B2
(45) Date of Patent: Aug. 9, 2022

(54) METHOD AND DEVICE FOR MEDIA STREAMING BETWEEN SERVER AND CLIENT USING RTP/RTSP STANDARD PROTOCOL

(71) Applicant: HANWHA TECHWIN CO., LTD., Seongnam-si (KR)

(72) Inventors: Jae Young Shin, Changwon-si (KR); Yun Seok Kwon, Changwon-si (KR); Hyun Ho Kim, Changwon-si (KR); Kyung Duk Kim, Changwon-si (KR); Min Jung Shim, Changwon-si (KR)

(73) Assignee: HANWHA TECHWIN CO., LTD., Seongnam-si (KR)

( * ) Notice: Subject to any disclaimer, the term of this patent is extended or adjusted under 35 U.S.C. 154(b) by 1069 days.

(21) Appl. No.: 15/613,557

(22) Filed: Jun. 5, 2017

(65) Prior Publication Data
US 2018/0183849 A1 Jun. 28, 2018

(30) Foreign Application Priority Data
Dec. 22, 2016 (KR) .......................... 10-2016-0176843

(51) Int. Cl.
*H04L 65/65* (2022.01)
*H04L 67/01* (2022.01)

(52) U.S. Cl.
CPC ............ *H04L 65/608* (2013.01); *H04L 67/42* (2013.01)

(58) Field of Classification Search
CPC ..................................................... H04L 65/608
See application file for complete search history.

(56) References Cited

U.S. PATENT DOCUMENTS

| 8,959,239 B2 | 2/2015 | Pettersson |
| 2005/0123267 A1* | 6/2005 | Tsumagari ........... G11B 27/322 386/230 |
| 2005/0157660 A1 | 7/2005 | Mandato et al. |

(Continued)

FOREIGN PATENT DOCUMENTS

| KR | 1020120064941 A | 6/2012 |
| KR | 1020140137251 A | 12/2014 |
| KR | 101647938 B1 | 8/2016 |

*Primary Examiner* — Nicholas R Taylor
*Assistant Examiner* — SM Z Islam
(74) *Attorney, Agent, or Firm* — Sughrue Mion, PLLC

(57) ABSTRACT

A real-time video streaming method between a server and a client according to a real-time transport protocol (RTP)/real-time streaming protocol (RTSP) standard protocol, including transmitting a DESCRIBE command including a Require header from a client to a server, wherein the client and the server support the Require header, receiving session description protocol (SDP) information from the server in response to the DESCRIBE command, receiving, at the client, a video from the server according to the RTP/RTSP standard protocol, in response to an encoding attribute of the video transmitted from the server to the client being changed, describing a changed encoding attribute in an RTP extension header of an RTP packet when the RTP packet is first transmitted in an RTP payload type determined according to the changed encoding attribute, and changing, at the client, a decoding setup based on the changed encoding attribute in the RTP extension header.

7 Claims, 16 Drawing Sheets

(56) References Cited

U.S. PATENT DOCUMENTS

| | | | |
|---|---|---|---|
| 2008/0162714 A1* | 7/2008 | Pettersson | H04L 65/80 709/231 |
| 2009/0110132 A1* | 4/2009 | Kondrad | H04L 65/4076 375/354 |
| 2009/0164655 A1* | 6/2009 | Pettersson | H04L 65/4015 709/231 |
| 2010/0161813 A1* | 6/2010 | Avasarala | H04L 65/1069 709/228 |
| 2011/0123170 A1* | 5/2011 | Kure | H04N 21/234318 386/241 |
| 2014/0029477 A1* | 1/2014 | Suryavanshi | H04W 4/16 370/260 |
| 2014/0372624 A1* | 12/2014 | Wang | H04W 36/14 709/231 |
| 2015/0341596 A1* | 11/2015 | Noy | H04N 7/152 348/14.09 |
| 2017/0085782 A1* | 3/2017 | Oyman | H04N 19/167 |
| 2019/0104306 A1* | 4/2019 | Wang | H04N 19/179 |

* cited by examiner

FIG. 2

< EXAMPLE OF MEDIA INFORMATION IN SDP FORMAT RECEIVED IN
RESPONSE TO RTSP DESCRIBE COMMAND - LIVE>
DESCRIBE rtsp://192.168.217.35:554/profile2/media.smp RTSP/1.0
CSeq: 4
User-Agent: Samsung techwin rtp/rtsp client
Accept: application/sdp RTSP/1.0 200 OK
CSeq: 4
Date: Wed, 03 Aug 2016 04:52:39 GMT
Expires: Wed, 03 Aug 2016 04:52:39 GMT
Cache-Control: must-revalidate
Content-Base: rtsp://192.168.217.35:554/profile2/media.smp
Content-Type: application/sdp
Content-Length: 932
x-Accept-Retransmit: our-retransmit
x-Accept-Dynamic-Rate: 1 v=0
o=- 0 0 IN IP4 192.168.217.22
s=Media Presentation
i=samsung
c=IN IP4 0.0.0.0
b=AS:8248
t=0 0
a=control:rtsp://192.168.217.35:554/profile2/media.smp
a=range:npt=now-
m=video 40048 RTP/AVP 98
b=AS:8192
a=rtpmap:98 H264/90000
a=control:rtsp://192.168.217.35:554/profile2/media.smp/trackID=v
a=cliprect:0,0,1080,1920
a=framesize:98 1920-1080
a=framerate:30.0
a=fmtp:98 packetization-mode=1;profile-level-id=64002A;sprop-parameter-sets=Z2QAKqwsaoHgCJ+WbgICAgQ=,aO4xMhM=
m=audio 40050 RTP/AVP 105
b=AS:48
a=rtpmap:105 mpeg4-generic/16000
a=control:rtsp://192.168.217.35:554/profile2/media.smp/trackID=a
a=recvonly
a=fmtp:105 profile-level-id=15; streamtype=5; mode=AAC-hbr; config=1408; SizeLength=13; IndexLength=3; IndexDeltaLength=3; bitrate=48000;
m=application 40052 RTP/AVP 107
b=AS:8
a=rtpmap:107 vnd.onvif.metadata/90000
a=control:rtsp://192.168.217.35:554/profile2/media.smp/trackID=m
a=recvonly

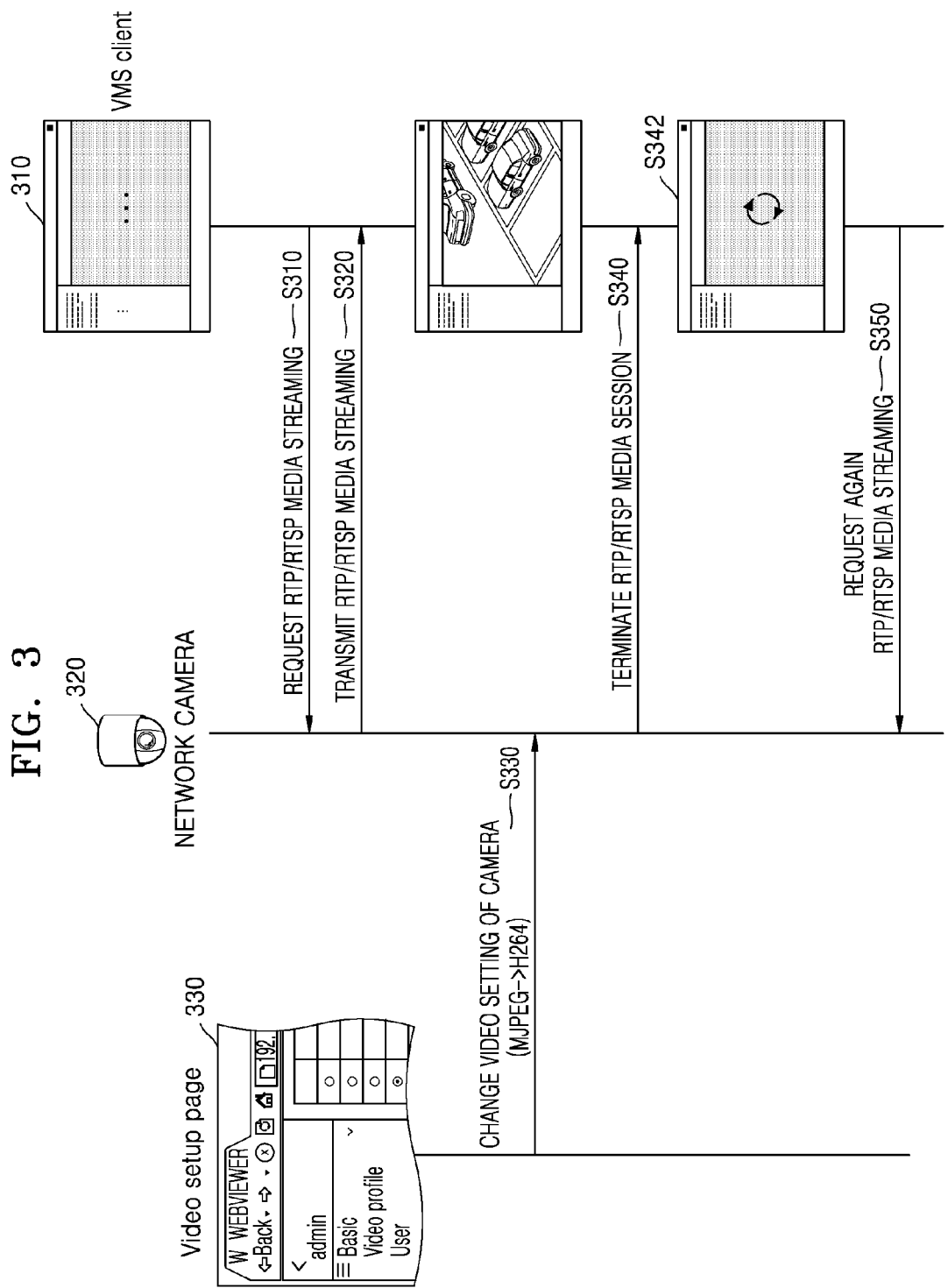

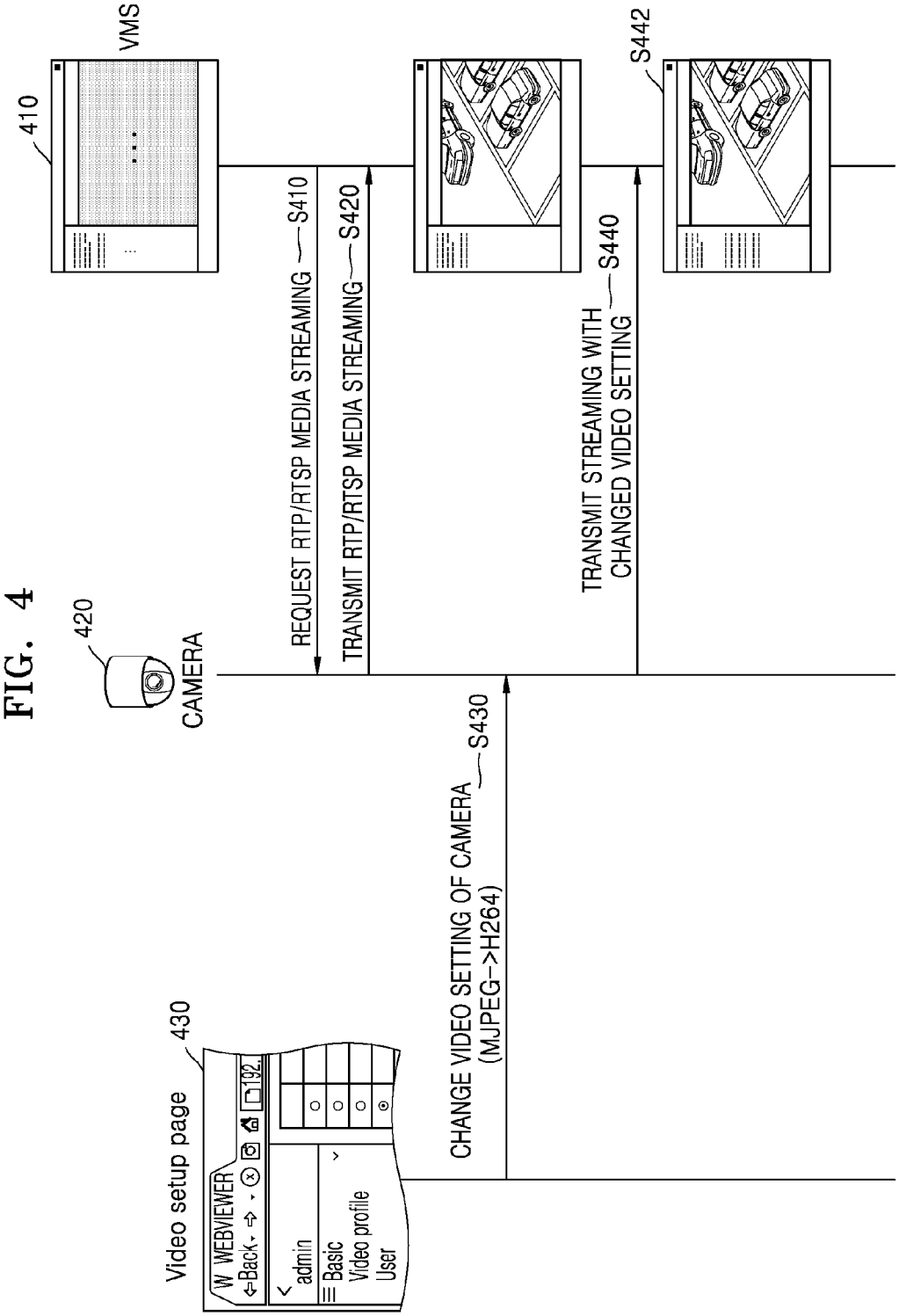

FIG. 6

<Client − Server>
DESCRIBE rtsp://192.168.0.1 RTSP/1.0
Cseq: 1
User-Agent: Rtsp client
Accept: application/sdp
Require: www.hanwha-security.com/rtsp/ver10/dynamic_sdp <Server − Client : RTSP server, unsupporting Require header>
RTSP/1.0 551 Option not supported
Cseq: 1
610 —— Unsupported: www.hanwha-security.com/rtsp/ver10/dynamic_sdp

FIG. 7

<Client – Server>
DESCRIBE rtsp://192.168.0.1 RTSP/1.0
Cseq: 1
User-Agent: Rtsp client
Accept: application/sdp
Require: www.hanwha-security.com/rtsp/ver10/dynamic_sdp <Server – Client : RTSP server, supporting Require header>
710 —— RTSP/1.0 200 OK
Cseq: 1
Content-Type: application/sdp
Content-Length: xxx
v=0
o= 2890842807 IN IP4 192.168.0.1
s=RTSP Session with dynamic SDP support
m=video 40000 RTP/AVP 98
a=rtpmap:98 H264/90000
a=control:rtsp://192.168.0.1/video
m=audio 40000 RTP/AVP 97
a=rtpmap:97 G726-32/8000
a=control:rtsp://192.168.0.1/audio

FIG. 8

Client - Server: VIDEO SETUP
SETUP rtsp://192.168.0.1/video RTSP/1.0
Cseq: 2
Transport: RTP/AVP;unicast;client_port=4588-4589
Require: www.hanwha-security.com/rtsp/ver10/dynamic_sdp Server - Client:
RTSP/1.0 200 OK
Cseq: 2
Session: 123124;timeout=60
Transport:RTP/AVP;unicast;client_port=4588-4589;
server_port=6256-6257

Client - Server: AUDIO SETUP
SETUP rtsp://192.168.0.1/audio RTSP/1.0 ——810
Cseq: 3
Session: 123124
Transport: RTP/AVP;unicast;client_port=4578-4579
Server - Client:
RTSP/1.0 200 OK
Cseq: 3

FIG. 9

Client − Server:
PLAY rtsp://192.168.0.1 RTSP/1.0 ─── 910
Cseq: 5
Session: 123124

Server − Client:
RTSP/1.0 200 OK
Cseq: 5
Session: 123124;timeout=60

FIG. 12
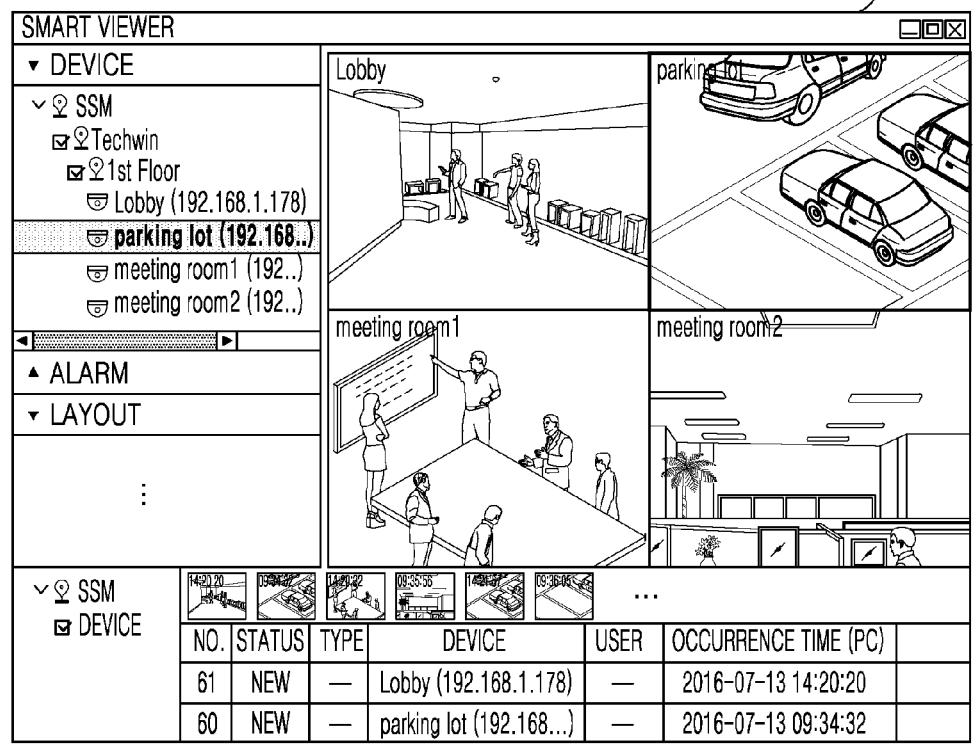
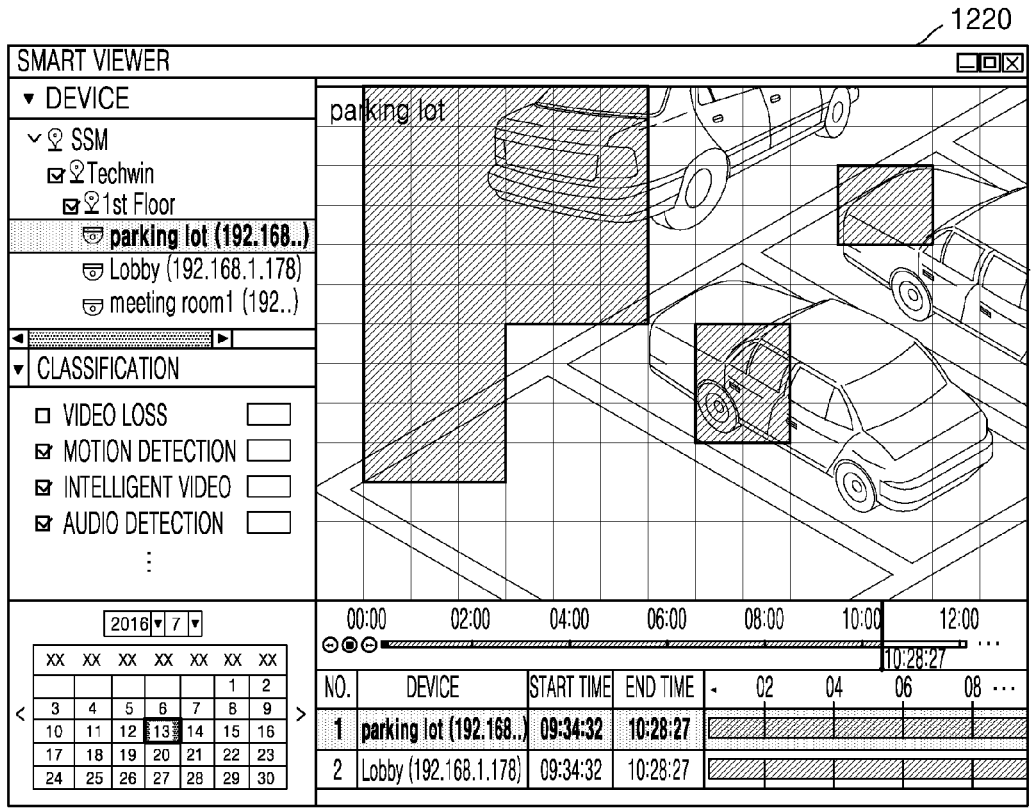

METHOD AND DEVICE FOR MEDIA STREAMING BETWEEN SERVER AND CLIENT USING RTP/RTSP STANDARD PROTOCOL

CROSS-REFERENCE TO RELATED APPLICATION

This application claims priority from Korean Patent Application No. 10-2016-0176843, filed on Dec. 22, 2016, in the Korean Intellectual Property Office, the disclosure of which is incorporated herein by reference in its entirety.

BACKGROUND

1. Field

One or more exemplary embodiments relate to a real-time encoding change during real-time transport protocol (RTP)/real-time streaming protocol (RTSP) streaming.

2. Description of Related Art

RTSP is a standard communication protocol (RFC2326) developed by the internet engineering task force (IETF) and used to remotely control a media server. In order to transmit a media streaming data including video and audio, RTP is generally used together with RTSP as a transport layer.

In the IP-based video surveillance market, media streaming using RTP/RTSP is widely used, and imaging apparatuses such as IP cameras, digital video recorders (DVRs), network video recorders (NVRs) and video surveillance standardization organizations such as the open network video interface forum (ONVIF) adopt standard protocols for media streaming using RTP/RTSP.

In RTSP, in order to receive media data, an RTP payload type is determined according to information about the media received in a Describe step and an encoding format of the media, and thus an RTP packet configuration method varies accordingly.

Thus, when encoding setting of the media connected by a media server is changed, the RTP/RTSP session is forcibly interrupted by the server, and a surveillance video of a corresponding camera is not displayed until the media session is reconnected.

SUMMARY

One or more exemplary embodiments include a method of supporting real-time encoding change during real-time transport protocol (RTP)/real-time streaming protocol (RTSP) streaming.

One or more exemplary include a method of transmitting and receiving video without reconnection of a streaming session even when a profile setting such as video or audio is changed during RTP/RTSP streaming.

Additional aspects will be set forth in part in the description which follows and, in part, will be apparent from the description, or may be learned by practice of the presented embodiments.

According to an aspect of an exemplary embodiment, a real-time video streaming method between a server and a client according to a real-time transport protocol (RTP)/real-time streaming protocol (RTSP) standard protocol includes transmitting a DESCRIBE command including a Require header from a client to a server, wherein the client and the server support the Require header, receiving session description protocol (SDP) information from the server in response to the DESCRIBE command, receiving, at the client, a video from the server according to the RTP/RTSP standard protocol, in response to an encoding attribute of the video transmitted from the server to the client being changed, describing a changed encoding attribute in an RTP extension header of an RTP packet when the RTP packet is first transmitted in an RTP payload type determined according to the changed encoding attribute, and changing, at the client, a decoding setup based on the changed encoding attribute in the RTP extension header.

The method may further include selectively displaying the changed encoding attribute on a display of the client in response to the RTP packet being transmitted from the server to the client.

The server and the client may follow a DESCRIBE-SETUP-PLAY-TEARDOWN method according to the RTSP standard protocol, the client may acquire a media type provided by the server from the DESCRIBE command, the client request a media provided by the server using a SETUP command, the server may initialize an RTP session according to the media type in response to the SETUP command of the client, the client may determine a playback, a playback speed, and a playback time point of the requested media according to a PLAY command, and the client may terminate the RTP session or an RTSP session according to a TEARDOWN command.

The RTP payload type may be determined based on the media type acquired through the DESCRIBE command at the client, and a configuration method of the RTP packet may vary according to the determined RTP payload type.

The changed encoding attribute may include at least one of RTP payload type information, codec information, resolution information, bit rate information, and frame rate information.

According to another aspect of an exemplary embodiment, a client for streaming a video according to a real-time transport protocol (RTP)/real-time streaming protocol (RTSP) standard protocol includes a controller configured to support a real-time switch between a live video and a recorded video in a single RTP/RTSP session, and a search interface configured to support search for the recorded video in the single RTP/RTSP session, wherein the controller includes a switch interface for selecting the live video or the recorded video a request generator configured to request a video selected through the switch interface from among the live video and the recorded video from a server using a SETUP command according to the RTP/RTSP standard protocol a receiver configured to receive the selected video requested by the request generator from the server, wherein, in response to the switch interface being activated, the controller may be configured to receive the selected video through the receiver, and the receiver may be further configured to receive from the server an RTP extension header describing an encoding attribute of the selected video, and to change a decoding setup.

When the live video is selected through the switch interface, the encoding attribute of the selected video may include an encoding attribute of the live video.

When the recorded video is selected through the switch interface, the encoding attribute of the selected video may include an encoding attribute of the recorded video.

The server may be configured to change the encoding attribute according to the selected video requested by the request generator, determine an RTP payload type according to the changed encoding attribute, and describe the changed encoding attribute in the RTP extension header when an RTP packet is first transmitted in a determined RTP payload type.

The client may further include an interface configured to change an encoding attribute of the live video.

According to yet another aspect of an exemplary embodiment, a method of streaming a video at a client according to a real-time transport protocol (RTP)/real-time streaming protocol (RTSP) standard protocol includes transmitting a DESCRIBE command including a Require header from a client to a server, wherein the client and the server support the Require header receiving session description protocol (SDP) information from the server in response to the DESCRIBE command, receiving, at the client, a video from the server according to the RTP/RTSP standard protocol, in response to an encoding attribute of the video transmitted from the server to the client being changed, receiving an RTP extension header of an RTP packet describing the changed encoding attribute when the RTP packet is received from the server to the client in an RTP payload type determined according to the changed encoding attribute, and performing decoding at the client based on the changed encoding attribute.

According to a further aspect of an exemplary embodiment, a method of streaming a video on a network camera according to a real-time transport protocol (RTP)/real-time streaming protocol (RTSP) standard protocol includes receiving a Require header from a client supporting the Require header, when the Require header is supported by the network camera, providing session description protocol (SDP) information from the network camera as a response to a DESCRIBE command of the client, initializing, by the network camera, a streaming session connection with the client based on a SETUP command received from the client, transmitting a video from the network camera to the client based on a PLAY command received from the client, and in response to an encoding attribute of the video transmitted from the network camera to the client being changed, transmitting an RTP extension header describing the changed encoding attribute to an RTP packet when the RTP packet is first transmitted in an RTP payload type determined according to the changed encoding attribute.

The client may perform decoding according to the changed encoding attribute described in the RTP extension header.

The changed encoding attribute may include at least one from among RTP payload type information, codec information, resolution information, bit rate information, and frame rate information.

BRIEF DESCRIPTION OF THE DRAWINGS

These and other aspects will become apparent and more readily appreciated from the following description of the exemplary embodiments, taken in conjunction with the accompanying drawings in which:

FIG. 2 illustrates an example of media information in a session description protocol (SDP) RFC 4566 format received in response to a DESCRIBE command;

FIG. 3 illustrates an example of forcibly interrupting an RTP/real-time streaming protocol (RTSP) session when encoding setting is changed in a network camera;

FIGS. 4 and 5 illustrate an example of transmitting and receiving video without reconnection of a session at a client end even when encoding setting is changed at a server end during RTP/RTSP streaming, according to an exemplary embodiment;

FIGS. 6, 7, 8 and 9 illustrate examples of a tag used to transmit a media according to the process of FIGS. 4 and 5 without interruption of a session when an encoding method is changed at a server, following a DESCRIBE-SETUP-PLAY method according to an RTSP standard protocol;

FIG. 12 illustrates an example of separately using a screen for reproducing a recorded video and a screen for a live video at a video management system (VMS) client;

DETAILED DESCRIPTION

Figure 1:
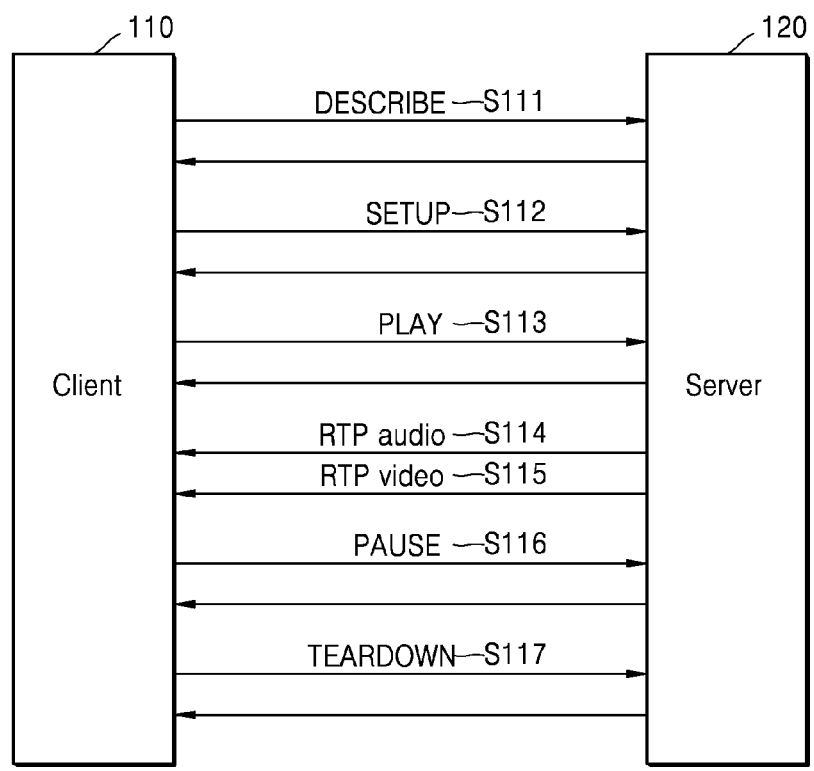
FIG. 1 illustrates an example of performing real-time video streaming between the client and the server according to a real-time transport protocol (RTP) standard protocol.

Reference will now be made in detail to exemplary embodiments, examples of which are illustrated in the accompanying drawings, wherein like reference numerals generally refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

According to an exemplary embodiment, a method of transmitting and receiving video without interruption may be implemented at a client that stably detects a real-time video or reproduces a stored video.

According to an exemplary embodiment, a video streaming method between a server and a client according to a real-time transport protocol (RTP)/real-time streaming protocol (RTSP) standard protocol is provided. According to exemplary embodiments, an RTP protocol and an RTSP protocol may be combined for use, for example, RTSP & RTP/UDP, RTP Over RTSP to RTP/RTSP/HTTP(S), or the like. However, in exemplary embodiments, video control commands such as "DESCRIBE", "SETUP", "PLAY", "PAUSE", to "TEARDOWN" may be implemented through an RTSP session and actual video transmission may be implemented through an RTP protocol.

According to an exemplary embodiment, a server may refer to all apparatuses for transmitting a video such as cameras, storage devices, etc., and a client may refer to all format from a video management system (VMS) for receiving a video to software, applications, etc.

An example of the client may include video surveillance apparatuses such as internet protocol (IP) cameras, digital video recorders (DVRs), network video recorders (NVRs), video management system (VMSs), etc. In addition, the client may be implemented in mobile phones, smartphones, smart watches, tablets, laptops, wearable devices, handheld devices, etc.

Recently, as a high quality network camera supporting full high-definition (FHD) and ultra high-definition (UHD) becomes popular, a method of effectively operating and transmitting a multi-profile considering a network bandwidth and video display performance is becoming important.

According to an exemplary embodiment, a method of transmitting and receiving a video without reconnection of a streaming session even when a profile setting of video or audio is changed during RTP/RTSP streaming at the client using a network camera having a high image quality is disclosed.

FIG. 1 illustrates an example of performing real-time video streaming between the client and the server according to the RTP standard protocol.

According to RTSP, the following example procedure may precede receiving media data. A client 110 acquires an RTSP address of a video server 120. An example of the RTSP address may be rtsp://192.168.217.35:554/profile2/media.smp.

At the client 110, the following operations are performed: acquiring information about a media type provided from the video server 120 through the DESCRIBE command at operation S111, requesting a media provided from the video server 120 through a SETUP command at operation S112, initializing an RTP session according to each media type received in response to the SETUP command at operation S112, determining and requesting playback of the media, a playback speed, and a playback time point through a PLAY command at operation S113, operation S114, and operation S115, pausing media transmission through a PAUSE command at operation S116, and terminating the RTSP session through a TEARDOWN command at operation S117.

In order to perform real-time video streaming between the client 110 and the video server 120 according to an example involving the RTP standard protocol, the following operation may be sequentially performed: acquiring information about a media type provided from the video server 120 through the DESCRIBE command at operation S111 and initializing an RTP session at operation S112 according to each media type provided from the video server 120 through the SETUP command.

FIG. 2 illustrates an example of media information in a session description protocol (SDP) RFC 4566 format received in response to the DESCRIBE command. FIG. 2 illustrates an example of streaming a video in real time.

An RTP PAYLOAD type may be determined according to media type information and an encoding format of video or audio received through the DESCRIBE command. A configuration method of an RTP packet varies according to the determined RTP PAYLOAD type.

Accordingly, when a codec provided by the video server 120 is changed, the configuration method of the RTP packet may be changed to be different. Furthermore, when video information such as a resolution or a frame rate provided by the video server 120 is changed, that is, the video information is changed, the video server 120 generally interrupts a corresponding RTP/RTSP session.

FIG. 3 illustrates an example of forcibly interrupting an RTP/RTSP session when encoding setting is changed in a network camera.

According to the exemplary embodiment illustrated in FIG. 3, RTP/RTSP media streaming is transmitted between a network camera 320 and a VMS client 310 at operation S310 and operation S320. When a video encoding setting of the network camera 320 is changed from MJPEG to H.264 on a video setup page 330 of the network camera 320 at operation S330, the network camera 320 terminates an RTP/RTSP media session transmitted to the VMS client 310 at operation S340. The VMS client 310 requests again media streaming from the network camera 320 at operation S350.

As in the example illustrated in FIG. 3, when an encoding setting is changed while the network camera 320 performs video streaming in real time, the network camera 320 terminates the RTP/RTSP media session transmitted to the VMS client 310 at operation S340 and then the VMS client 310 again requests media streaming from the network camera 320. In this state, while the media session is reconnected, a surveillance video is not displayed on a screen of the VMS client 310 at operation S342.

According to an exemplary embodiment, as illustrated in FIG. 3, a problem that may occur, in which a screen breaks at the VMS client 310 receiving a media when an encoding setting is changed at the network camera 320, may be solved.

According to an exemplary embodiment, when an encoding setting is changed on the network camera, unlike the example illustrated in FIG. 3, a method of receiving media data without interruption and without a request of reconnection of a media session may be provided.

Figure 5:
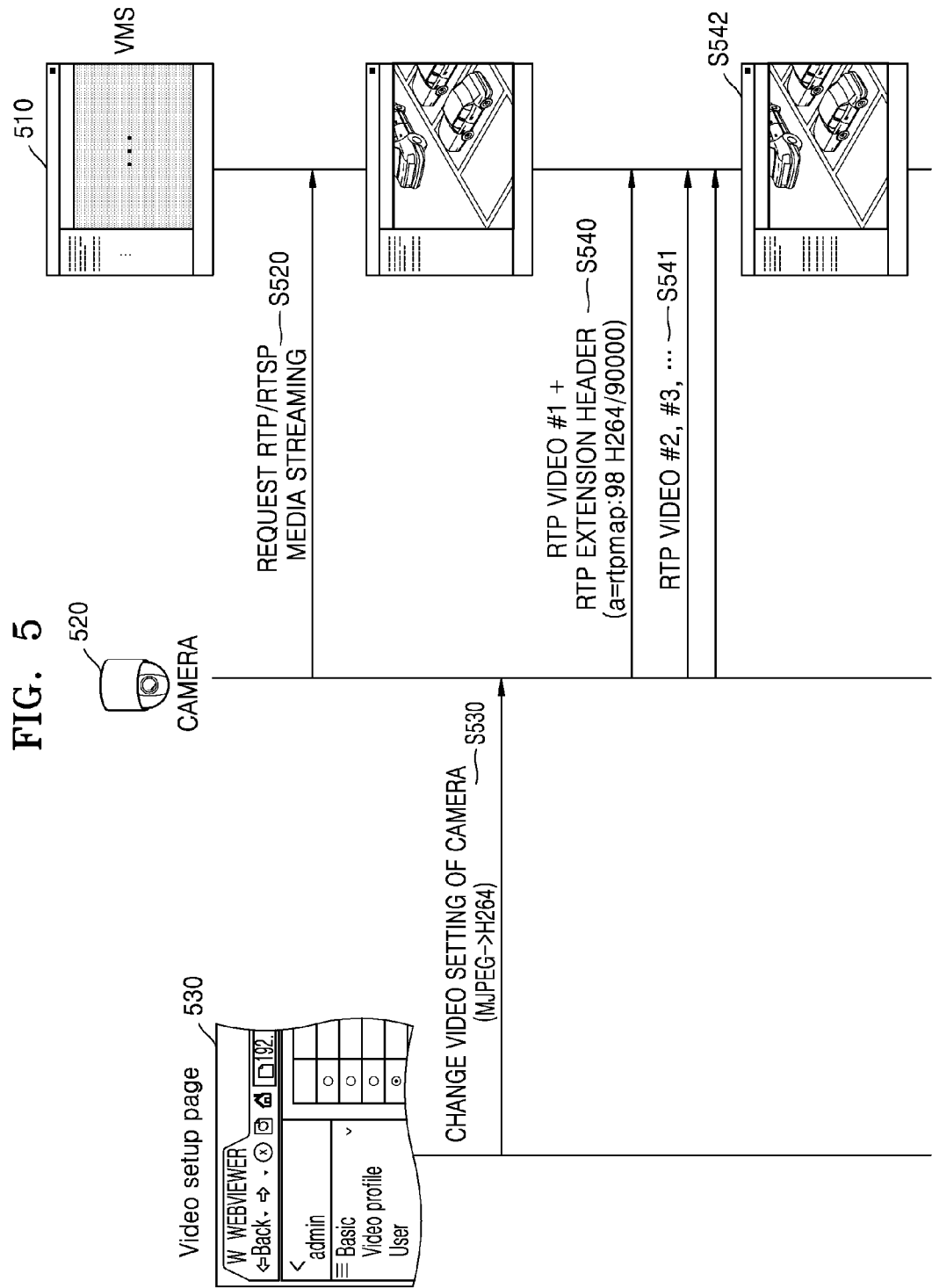

FIGS. 4 and 5 illustrate an example of transmitting and receiving video without reconnection of a session at a client end even when encoding setting is changed at a server end during RTP/RTSP streaming, according to an exemplary embodiment. FIG. 4 illustrates an example of exchanging an RTP extension header according to an exemplary embodiment, and FIG. 5 is a detailed view of this exemplary embodiment.

FIGS. 6 through 9 illustrate an example of a "Require" header used to transmit a media according to the example processes of FIGS. 4 and 5 without interruption of a session when an encoding method is changed at a server, following a DESCRIBE-SETUP-PLAY method according to the RTSP standard protocol.

In some exemplary embodiments which not support the "Require" header, referring to FIG. 6, the server may respond that it does not support the "Require" header through a tag 610 of "Unsupported" according to the RTSP standard protocol. In this case, the server may undergo the process of FIG. 3.

In some exemplary embodiments, both the server and the client support the "Require" header. The "Require" header is a tag of an RTSP (RFC 2326) standard protocol. Referring to FIG. 7, when the server supports the "Require" header, the server may transmit a message 710 to the client indicting that the server supports the "Require" header.

FIG. 8 illustrates a process of initializing a streaming session connection through a SETUP message extension 810 at the client when the server normally transmits SDP information as a response to an RTSP DESCRIBE command, according to an exemplary embodiment.

FIG. 9 illustrates a process of performing media streaming through an RTSP PLAY command 910 when the SETUP command with respect to an RTP session of each of video or audio type media is completed through FIG. 8, according to an exemplary embodiment.

Referring again to FIGS. 4 and 5, RTP/RTSP streaming may be performed when both the server and the client support the "Require" header.

According to an exemplary embodiment illustrated in FIG. 4, when a VMS client 410 requests RTP/RTSP media streaming at operation S410, a network camera 420 transmits the RTP/RTSP media streaming at operation S420. In a process of transmitting the RTP/RTSP media streaming from the network camera 420 to the VMS client 410. When a video encoding setting of the network camera 420 is changed from MJPEG to H.264 on a video setup page 430 the network camera 420 changes a video encoding setting from MJPEG to H.264 at operation S430, and the RTP/RTSP media streaming is transmitted from the network camera 420 to the VMS client 410 without interruption of a session at operation S440 and S442. FIG. 5 illustrates a similar process, according to an exemplary embodiment.

To perform the above process, according to an exemplary embodiment, both the VMS client 410 and the network camera 420 support the "Require" header. As in the exemplary embodiment of FIG. 6, the "Require" header is transmitted from the VMS client 410 to the network camera 420, and the SETUP is completed as in the exemplary embodiment of FIG. 7.

Then, as in the exemplary embodiment of FIG. 8, after the transmission of RTP media streaming data is initiated through a RTSP PLAY command, when the encoding setting of a corresponding media file is changed, the network camera 420 includes a content subject to a change in an RTP extension header 920 of FIG. 9 and transmits the RTP extension header 920 to the VMS client 410 at operation S440. The decoding setup is changed at a VMS client 510 according to the content of the received RTP extension header 920 so that a corresponding media may be received without interruption of a session.

According to exemplary embodiments relating to the RTSP standard protocol, an RTP payload type is determined according to information and an encoding format of a media received in the Describe step to receive the media data, and thus a configuration method of an RTP packet may vary accordingly.

Referring to FIG. 5, according to an exemplary embodiment an encoding setting of a network camera 520 is changed from MJPEG to H.264, for example using video setup page 530 at operation S530. When an RTP is first transmitted in a RTP payload type determined above, a changed content is described in the RTP extension header at operation S540. While the encoding setting of a corresponding media file is not changed, the RTP extension header is not included in the media file. A corresponding media may be received without interruption of a session as the decoding setup is changed at the VMS client 510 according to the content of the received RTP extension header.

Figure 10:
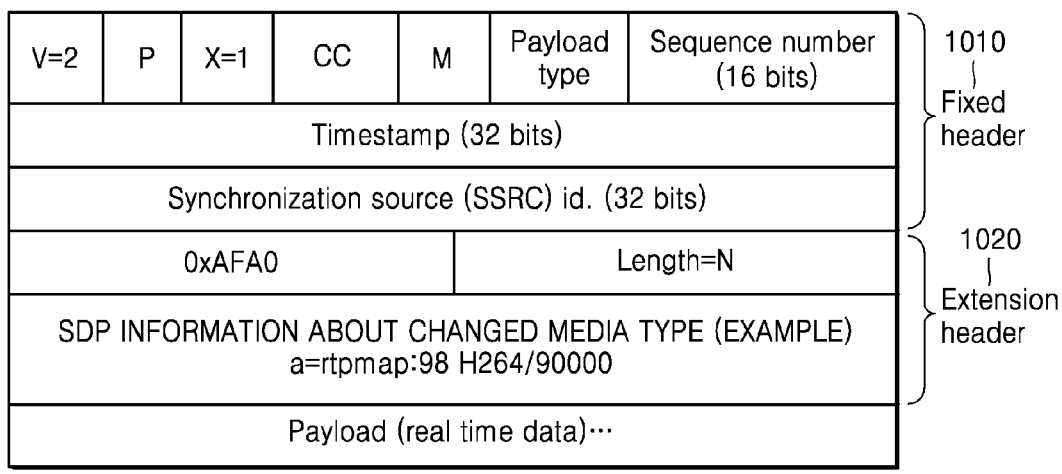
FIG. 10 illustrates an RTP header in an SDP format used according to an exemplary embodiment.

FIG. 10 illustrates an RTP header in an SDP format used according to an exemplary embodiment.

According to an exemplary embodiment, an RTP header may include an RTP fixed header 1010 and an RTP extension header 1020 according to the RTSP standard protocol. According to an exemplary embodiment, a description method of the RTP extension header 1020 follows the RTP standard protocol (RFC3550).

According to an exemplary embodiment, the RTP extension header 1020 may be in the SDP format, and may describe information about the encoding attribute changed at the server in a corresponding RTP session. The RTP extension header 1020 may include, for example, information about an attribute defining an RTP payload type (a=rtpmap), information about an additional codec (a=fmtp), information about a resolution of a video (a=framesize), information about FPS (a=framerate), etc.

Figure 11:
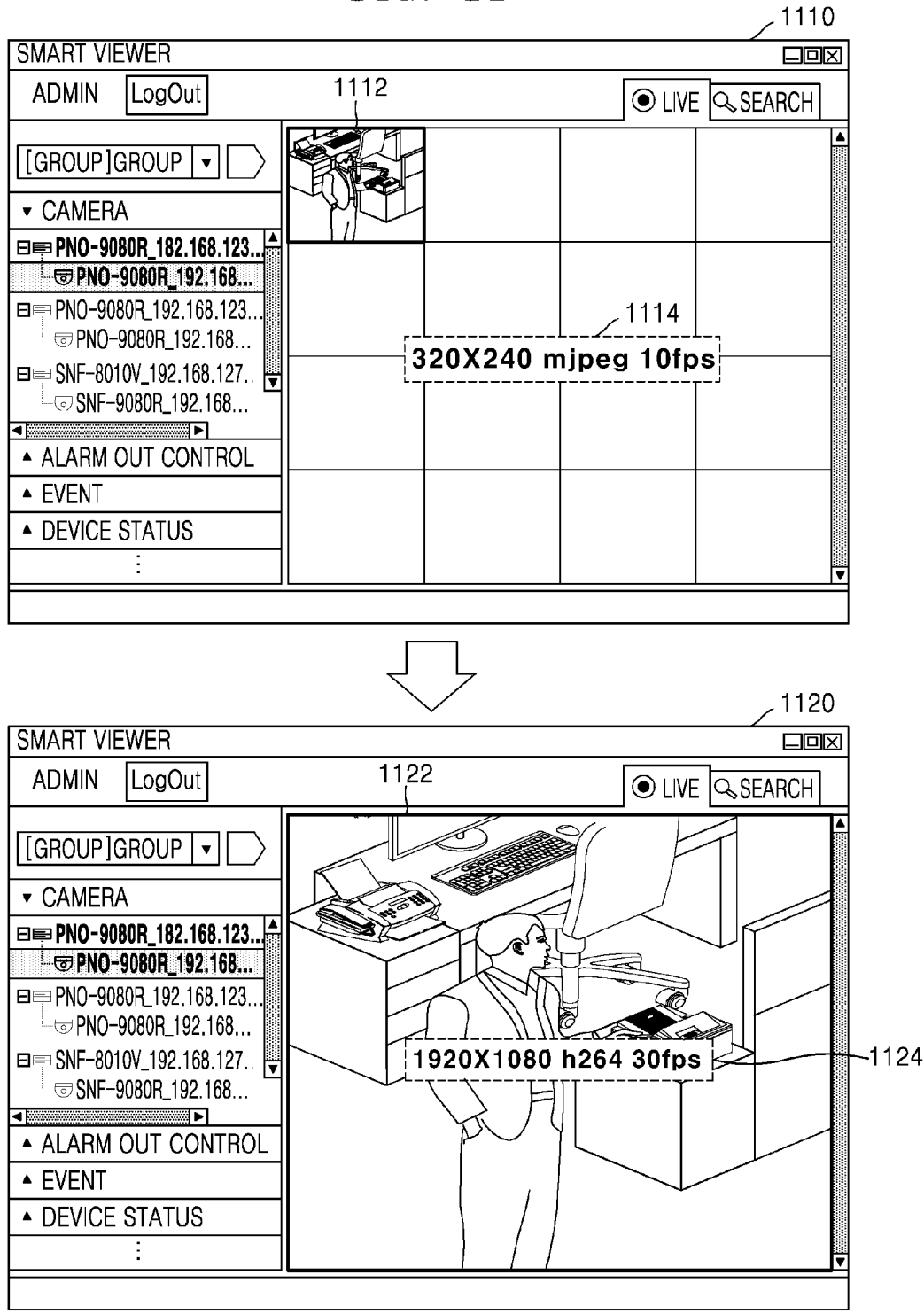
FIG. 11 illustrates a case of switching from a multichannel surveillance screen to a single channel surveillance screen, according to an exemplary embodiment.

FIG. 11 illustrates switching from a multichannel surveillance screen to a single channel surveillance screen, according to an exemplary embodiment.

In the exemplary embodiment of FIG. 11, an example of changing the encoding attribute of a media transmitted from the network camera to the client is illustrated. Furthermore, in the exemplary embodiment of FIG. 11, a request to switch a multichannel surveillance screen to a single channel surveillance screen from the client to the network camera may be implemented. Furthermore, a method of switching from a single channel surveillance screen to a multichannel surveillance screen may be implemented. For convenience of explanation, the following description focuses on the example of switching from a multichannel surveillance screen to a single channel surveillance screen.

A channel displayed on a screen 1112 showing a video transmitted from a first network camera and displayed on a multichannel surveillance screen 1110 displaying a multichannel live video may be displayed on a single channel surveillance screen 1120 according to a changed encoding setting.

In other words, the channel displayed on a screen 1112 of the multichannel surveillance screen 1110 at a low resolution may be displayed on a screen 1122 of the single channel surveillance screen 1120 at a high resolution.

When the channel displaying the video transmitted from the first network camera is displayed on screen 1112 of the multichannel surveillance screen 1110, the encoding attribute may be set to a resolution of 320×240, a MJPEG compression method, and a frame rate of 10 fps. However, when the channel displaying the video transmitted from the first network camera is displayed on the screen 1122 of the single channel surveillance screen 1120, the encoding attribute may be set to a resolution of 1920×1080, a jpeg compression method, and a frame rate of 30 fps.

In related art, when a playback method is changed from a multichannel surveillance screen to a single channel surveillance screen, reconnection of a media session is required and thus the media session is interrupted.

However, according to an exemplary embodiment, as illustrated in FIG. 11, when a playback method is changed from the multichannel surveillance screen 1110 to the single channel surveillance screen 1120, and when the video setting of a media session currently being streamed is changed, the media session is not interrupted.

According to an exemplary embodiment, when the encoding attribute is changed at the network camera, and an RTP is first transmitted in an RTP payload type determined accordingly, as in the exemplary embodiment of FIG. 5, a changed content is described in the RTP extension header.

According to an exemplary embodiment, a part of the changed content described in the RTP extension header is displayed on a screen, for example as notification 1114 or notification 1124, and thus, the client may confirm that the encoding setting of the media session currently being streamed is changed.

In this case, it may be selected to display the changed encoding attribute on the client's screen only when the RTP packet is first transmitted from the network camera to the client.

FIG. 12 illustrates an example of separately using a screen for reproducing a recorded video and a screen for a live video at the VMS client. In the related art, when the recorded video playback screen and the live video screen are monitored together, a video setting of the recorded video may be continuously changed so that a media session may be interrupted several times. Accordingly, in the related art, the recorded video playback screen and the live video screen are implemented in separate media sessions, for example session 1210 and session 1220.

Figure 13:
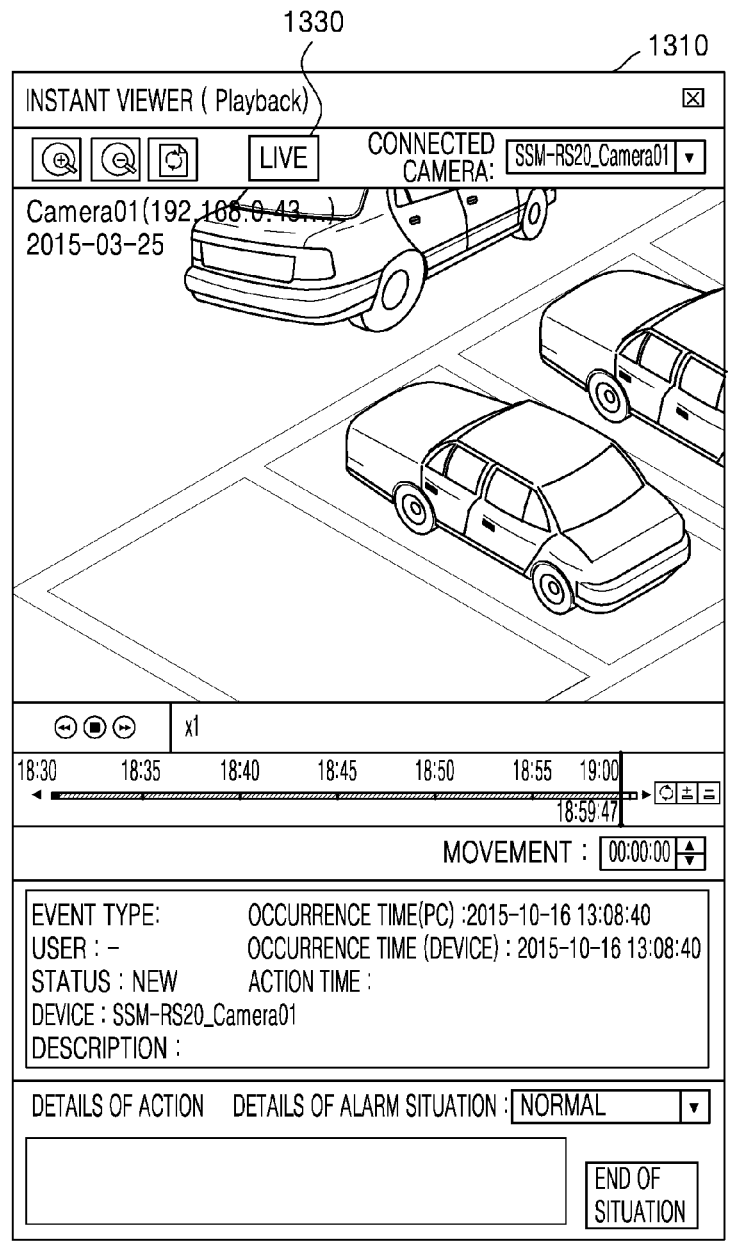
FIG. 13 illustrates an example of implementing a screen for reproducing a recorded video and a screen for a live video at the VMS client in one media session, according to an exemplary embodiment.

FIG. 13 illustrates an example of implementing a screen for reproducing a recorded video and a screen for a live video at the VMS client in one media session, according to an exemplary embodiment.

According to an exemplary embodiment, the VMS client may switch the recorded video and the live video without interruption in one media session 1310. In FIG. 13, although the recorded video 1320 is being reproduced, the recorded video 1320 may be switched to the live video through a switch interface 1330.

According to an exemplary embodiment, the VMS client provides a search function of detecting an object of a particular time by applying a hit map in the recorded video.

Figure 14:
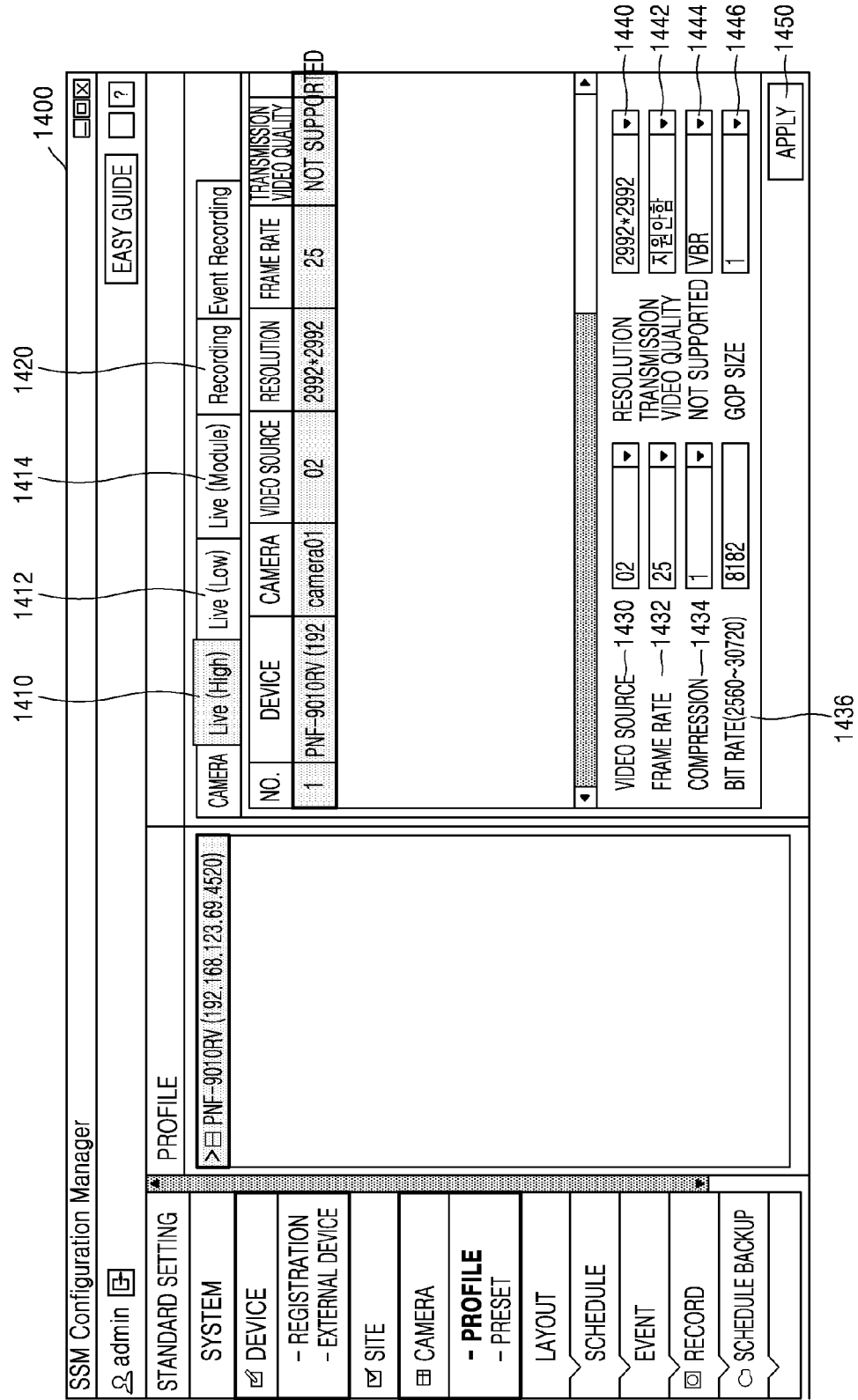
FIG. 14 illustrates an example of supporting an interface for setting the encoding attribute of streaming received at the client, according to an exemplary embodiment.

FIG. 14 illustrates an example of supporting an interface for setting an encoding attribute of streaming received at the client, according to an exemplary embodiment.

A client 1400 may provide an interface to select a high-quality live video screen 1410, a low-quality live video screen 1412, a mobile phone live video screen 1414, or a recorded video 1420.

Also, the client 1400 supports interfaces to change encoding attributes, in addition to a video source 1430. According to an exemplary embodiment, interfaces of the encoding attributes may include a frame rate interface 1432, compression interface 1434, a bit rate interface 1436, a resolution interface 1440, a transmission video quality interface 1442, bit rate control interface 1444, and a group of pictures (GOP) size interface 1446.

When the encoding attribute is changed, after receiving from the user an input of an attribute to be changed, the client 1400 may input the SETUP command setting described in FIG. 8 and transmit the input to the network camera or the server.

Figure 15:
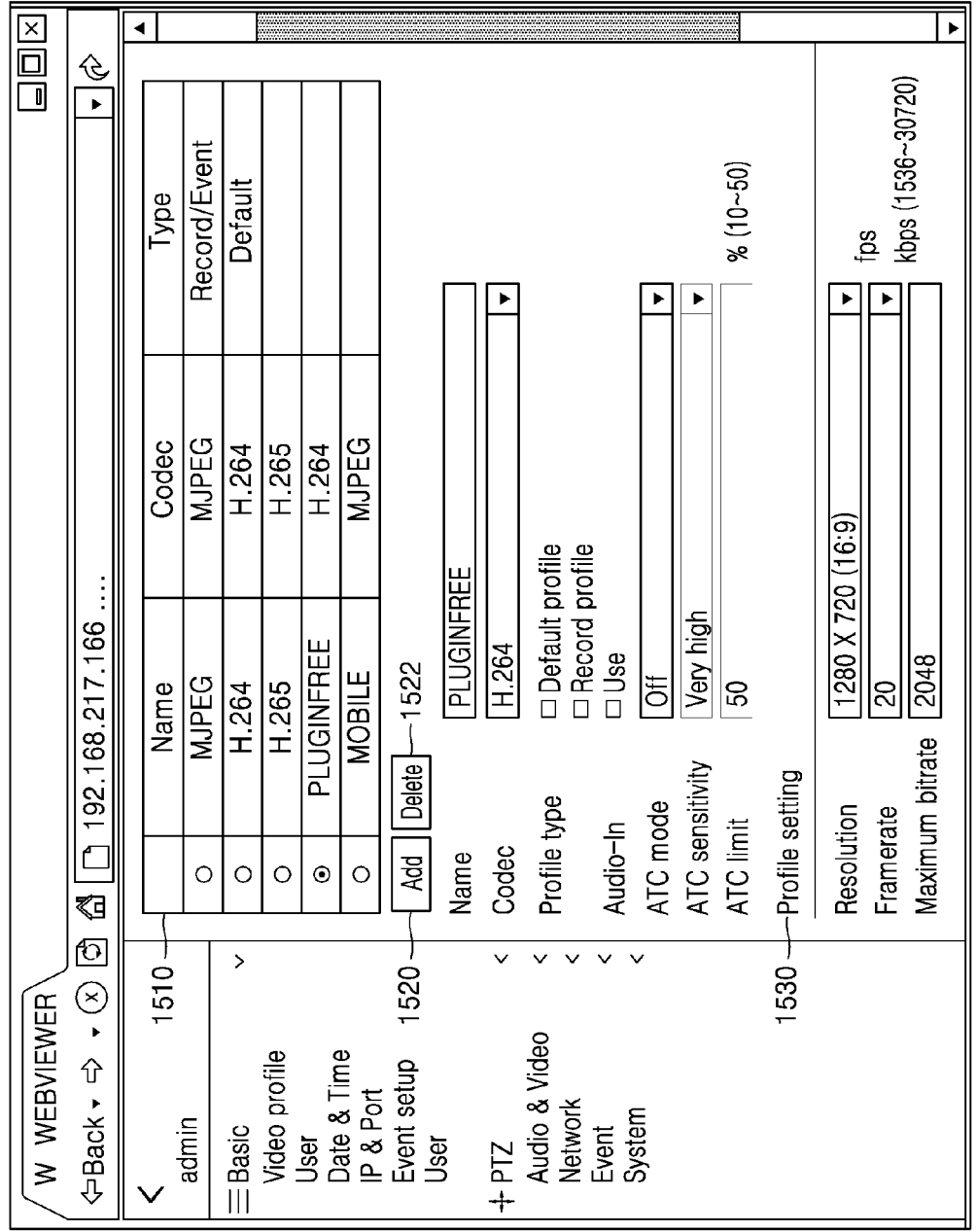
FIG. 15 illustrates an example of a setting menu screen of a network camera, according to an exemplary embodiment.

FIG. 15 illustrates an example of a setting menu screen of the network camera, according to an exemplary embodiment.

The network camera or the server support an interface for setting encoding attributes of a media streamed at the network camera or server. In a network camera setting menu, an interface 1510 for selecting an encoding attribute among preset conditions may be supported.

Furthermore, in the network camera setting menu, an interface 1520 for adding a new encoding attribute setting, and an interface 1522 for deleting an existing attribute setting may be supported.

Furthermore, in the network camera setting menu, an interface 1530 may be used for setting variables, a resolution, a frame rate, a maximum bit rate, etc., which constitute a new encoding attribute.

Figure 16:
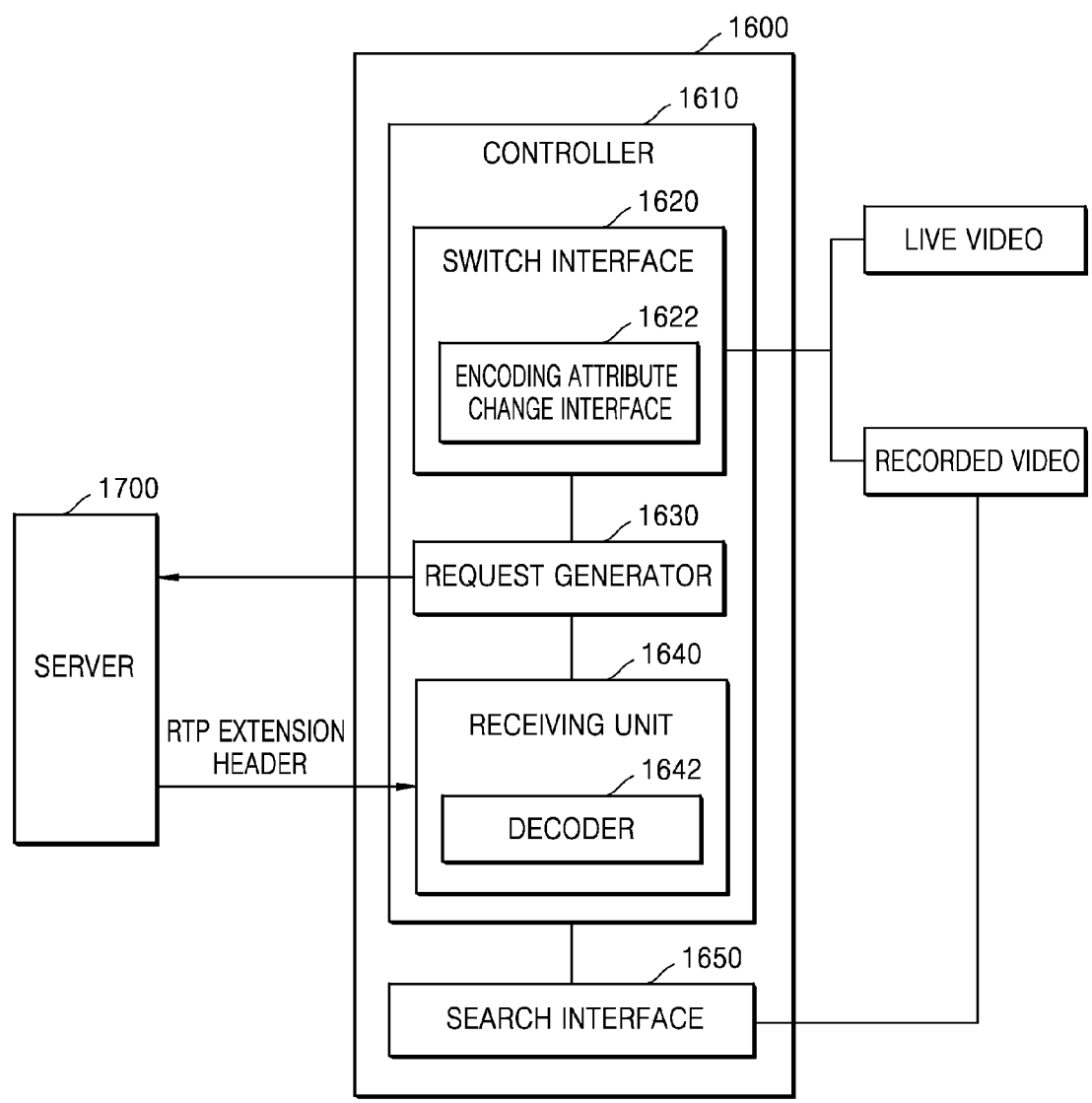
FIG. 16 is a block diagram of an internal structure of a client supporting streaming of the live video and the recorded video of FIG. 13 in a single RTP/RTSP session, according to an exemplary embodiment.

FIG. 16 is a block diagram of an internal structure of a client 1600 supporting streaming of the live video and the recorded video of FIG. 13 in a single RTP/RTSP session, according to an exemplary embodiment.

The client 1600 may make wired or wireless communication with a server 1700. The client 1600 may include a controller 1610 and a search interface 1650. The search interface 1650 supports search in a recorded video. The search interface 1650 may support a time section setting, a heatmap setting, etc.

The controller 1610 may include a switch interface 1620, a request generator 1630, and a receiver 1640. The switch interface 1620 may further include an encoding attribute change interface 1622. The receiver 1640 may further include a decoder 1642.

According to an exemplary embodiment, the client 1600 and the server 1700 follow an RTP/RTSP standard protocol and both the client 1600 and the server 1700 support the Require header. When the encoding attribute is changed at the server 1700, the client 1600 may perform streaming without forcible interruption of a session according to the process of FIGS. 4 and 5.

According to an exemplary embodiment, the client 1600 may support a real-time switching between the live video and the recorded video as in the exemplary embodiment of FIG. 13.

The controller 1610 of the client 1600 may be implemented by a processor or the like, and a real-time switch between the live video and the recorded video may be possible through a switch interface 1620. The switch interface 1620 may be implemented in the form of the switch interface 1330 of FIG. 13. The switch interface 1330 may display a video selected by the user as the user selects, for example, "LIVE" or "Playback" in a toggle mode.

When the user selects a live video, the encoding attribute change interface 1622 may be supported to additionally change an encoding attribute of the selected live video. An example of the encoding attribute change interface 1622 may be substantially the same as the interfaces illustrated in FIG. 14.

When a live video is selected in the switch interface 1620, the request generator 1630 requests the live video from the server 1700. When a recorded video is selected in the switch interface 1620, the request generator 1630 requests the recorded video from the server 1700.

The receiver 1640 receives the live video or the recorded video requested by the request generator 1630. When the switch interface 1620 is activated, the controller 1610 receives a video selected through the switch interface 1620 among the live video and the recorded video received by the receiver 1640. The decoder 1642 receives from the server 1700 the RTP extension header describing the encoding attribute of the selected video and performs decoding according to the changed encoding attribute described in the received RTP extension header.

Exemplary embodiments can also be embodied as computer readable codes on a computer readable recording medium. The computer readable recording medium may be any data storage device that can store data which can thereafter be read by a computer system. Examples of the computer readable recording medium include read-only memory (ROM), random-access memory (RAM), CD-ROMs, magnetic tapes, floppy disks, optical data storage devices, etc. The computer readable recording medium can also be distributed over network coupled computer systems so that the computer readable code is stored and executed in a distributive manner.

At least one of the components, elements, modules or units represented by a block as illustrated in the drawings, for example, the request generator 1630 and the decoder 1642 in FIG. 16, may be embodied as various numbers of hardware, software and/or firmware structures that execute respective functions described above, according to an exemplary embodiment. For example, at least one of these components, elements, modules or units may use a direct circuit structure, such as a memory, a processor, a logic circuit, a look-up table, etc. that may execute the respective functions through controls of one or more microprocessors or other control apparatuses. Also, at least one of these components, elements, modules or units may be specifically embodied by a module, a program, or a part of code, which contains one or more executable instructions for performing specified logic functions, and executed by one or more microprocessors or other control apparatuses. Also, at least one of these components, elements, modules or units may further include or may be implemented by a processor such as a central processing unit (CPU) that performs the respective functions, a microprocessor, or the like. Two or more of these components, elements, modules or units may be combined into one single component, element, module or unit which performs all operations or functions of the combined two or more components, elements, modules or units. Also, at least part of functions of at least one of these components, elements, modules or units may be performed by another of these components, elements, modules or units. Further, although a bus is not illustrated in the above block diagrams, communication between the components, elements, modules or units may be performed through the bus. Functional aspects of the above exemplary embodiments may be implemented in algorithms that execute on one or more processors. Furthermore, the components, elements, modules or units represented by a block or processing steps may employ any number of related art techniques for electronics configuration, signal processing and/or control, data processing and the like.

As described above, according to the above-described exemplary embodiments, the server and client following the RTP/RTSP standard protocol has an effect of streaming audio and video without interruption of a session. According to the above-described exemplary embodiments, even when a low-quality video is changed to a high-quality video, the client following the RTP/RTSP standard protocol may stream a video without interruption of a session. According to the above-described exemplary embodiments, the client may provide real-time switch between a live video and a recorded video.

According to the above-described exemplary embodiments, when an encoding attribute is changed, the encoding attribute may be freely changed while the network camera streams a video to the client without interruption of a session.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:
1. A real-time video streaming method between a server and a client according to a real-time transport protocol (RTP)/real-time streaming protocol (RTSP) standard protocol, the method comprising:
   transmitting a DESCRIBE command including a Require header from the client to the server, wherein the client and the server support the Require header;
   receiving session description protocol (SDP) information from the server in response to the DESCRIBE command;
   receiving, at the client, a video from the server according to the RTP/RTSP standard protocol;
   in response to an encoding attribute of the video transmitted from the server to the client being changed, describing a changed encoding attribute in an RTP extension header of an RTP packet when the RTP packet is first transmitted in an RTP payload type determined according to the changed encoding attribute; and
   changing, at the client, a decoding setup based on the changed encoding attribute in the RTP extension header,
   wherein the encoding attribute comprises original codec information indicating a first codec,
   wherein the changed encoding attribute comprises changed codec information indicating a second codec different from the first codec,
   wherein the first codec is used to encode the video before the encoding attribute is changed, and
   wherein the second codec is used to encode the video after the encoding attribute is changed.

2. The method of claim 1, further comprising selectively displaying the changed encoding attribute on a display of the client in response to the RTP packet being first transmitted from the server to the client.

3. The method of claim 1, wherein the server and the client follow a DESCRIBE-SETUP-PLAY-TEARDOWN method according to the RTSP standard protocol, and
   wherein the client acquires a media type provided by the server from the DESCRIBE command, the client requests a media provided by the server using a SETUP command, the server initializes an RTP session according to the media type in response to the SETUP command of the client, the client determines a playback, a playback speed, and a playback time point of the requested media according to a PLAY command, and the client terminates the RTP session or an RTSP session according to a TEARDOWN command.

4. The method of claim 3, wherein the RTP payload type is determined based on the media type acquired through the DESCRIBE command at the client, and a configuration method of the RTP packet varies according to the determined RTP payload type.

5. The method of claim 1, wherein the changed encoding attribute comprises at least one of RTP payload type information, codec information, resolution information, bit rate information, and frame rate information.

6. The method of claim 1, wherein the decoding setup is established at the client based on the SDP information received from the server, and
   wherein the changing of the decoding setup comprises changing the decoding setup to a changed decoding setup based on the changed encoding attribute in the RTP extension header received while the video is being received by the client.

7. A method of streaming a video at a server according to a real-time transport protocol (RTP)/real-time streaming protocol (RTSP) standard protocol, the method comprising:
   receiving a Require header from a client supporting the Require header;
   when the Require header is supported by the server, providing session description protocol (SDP) information from the server as a response to a DESCRIBE command of the client;

receiving, at the client, a video from the server according to the RTP/RTSP standard protocol;

in response to an encoding attribute of the video transmitted from the server to the client being changed, receiving an RTP extension header of an RTP packet describing the changed encoding attribute when the RTP packet is received from the server to the client in an RTP payload type determined according to the changed encoding attribute; and performing decoding at the client based on the changed encoding attribute, wherein the encoding attribute comprises original codec information indicating a first codec, wherein the changed encoding attribute comprises changed codec information indicating a second codec different from the first codec, wherein the first codec is used to encode the video before the encoding attribute is changed, and wherein the second codec is used to encode the video after the encoding attribute is changed.

* * * * *